US007944841B2

(12) United States Patent
Youn et al.

(10) Patent No.: US 7,944,841 B2
(45) Date of Patent: May 17, 2011

(54) METHOD AND APPARATUS FOR TRANSMITTING ERROR INFORMATION BETWEEN ETHERNET NETWORK AND SYNCHRONOUS DIGITAL HIERARCHY NETWORK

(75) Inventors: Ji-Wook Youn, Daejeon (KR); Bheom-Soon Joo, Daejeon (KR); Jung-Sik Kim, Daejeon (KR)

(73) Assignee: Electronic and Telecommunications Research Institute, Daejeon (KR)

( * ) Notice: Subject to any disclaimer, the term of this patent is extended or adjusted under 35 U.S.C. 154(b) by 495 days.

(21) Appl. No.: 11/947,317

(22) Filed: Nov. 29, 2007

(65) Prior Publication Data

US 2008/0138084 A1    Jun. 12, 2008

(30) Foreign Application Priority Data

Dec. 8, 2006  (KR) .................. 10-2006-0125130
Sep. 3, 2007  (KR) .................. 10-2007-0089066

(51) Int. Cl.
*G01R 31/08* (2006.01)
*H04L 1/00* (2006.01)

(52) U.S. Cl. ............................. 370/236.1; 370/241.1
(58) Field of Classification Search ............ 370/907, 370/395, 236.2
See application file for complete search history.

(56) References Cited

U.S. PATENT DOCUMENTS

| 7,031,341 | B2 * | 4/2006 | Yu .............................. 370/469 |
| 7,043,541 | B1 * | 5/2006 | Bechtolsheim et al. ...... 709/223 |
| 7,197,008 | B1 * | 3/2007 | Shabtay et al. ............. 370/218 |
| 7,492,714 | B1 * | 2/2009 | Liao et al. .................. 370/235 |
| 2006/0133411 | A1 * | 6/2006 | Denton et al. ............ 370/463 |
| 2006/0221841 | A1 * | 10/2006 | Lee et al. ................. 370/242 |
| 2007/0133564 | A1 * | 6/2007 | Chun et al. ............. 370/395.51 |

FOREIGN PATENT DOCUMENTS

| GB | 2423447 | * | 4/2005 |
| KR | 1020050051963 A | | 6/2005 |
| KR | 1020050064097 A | | 6/2005 |

* cited by examiner

*Primary Examiner* — Derrick W Ferris
*Assistant Examiner* — Angel Brockman

(57) ABSTRACT

Provided are a method and apparatus for transmitting error information between an Ethernet network and a synchronous digital hierarchy (SDH) network. According to the present invention, when an error occurs in the Ethernet network or the SDH network, OAM information is transferred to the opposite network by using a conventional MAC control frame from a linked part of the Ethernet network and the SDH network and thus the EoS network may be efficiently operated and managed. Also, by using standardized MAC control frame, the present invention may be applied to an existing system without additionally changing hardware or defining a new OAM frame.

15 Claims, 13 Drawing Sheets

| | | OAM TYPE |
|---|---|---|
| UPPER 8 BITS | 10 | ETHERNET NETWORK ERROR |
| | 11 | SDH NETWORK ERROR |
| | 20 | NETWORK LINKAGE TEST |
| | 30 | PERFORMANCE INFORMATION |
| LOWER 8 BITS | 11 | AIS |
| | 12 | RDI |
| | 14 | LOS |
| | 21 | LINKAGE TEST REQUEST |
| | 22 | LINKAGE TEST RESPONSE |
| | 31 | LOF |
| | 32 | DELAY |
| | 34 | JITTER |

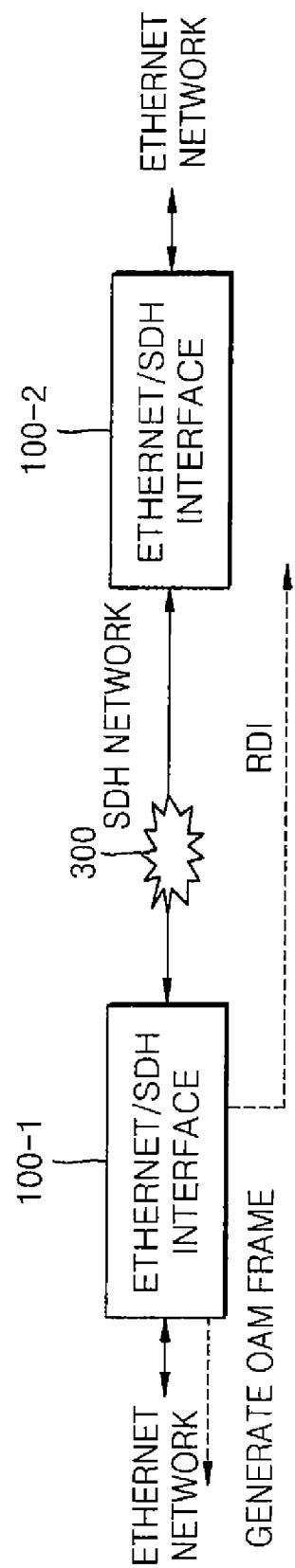

FIG. 4B

| OAM TYPE | | |
|---|---|---|
| UPPER 8 BITS | 10 | ETHERNET NETWORK ERROR |
| | 11 | SDH NETWORK ERROR |
| | 20 | NETWORK LINKAGE TEST |
| | 30 | PERFORMANCE INFORMATION |
| LOWER 8 BITS | 11 | AIS |
| | 12 | RDI |
| | 14 | LOS |
| | 21 | LINKAGE TEST REQUEST |
| | 22 | LINKAGE TEST RESPONSE |
| | 31 | LOF |
| | 32 | DELAY |
| | 34 | JITTER |

METHOD AND APPARATUS FOR TRANSMITTING ERROR INFORMATION BETWEEN ETHERNET NETWORK AND SYNCHRONOUS DIGITAL HIERARCHY NETWORK

CROSS-REFERENCE TO RELATED PATENT APPLICATION

This application claims the benefit of Korean Patent Applications No. 10-2006-0125130, filed on Dec. 5, 2006, and No. 10-2007-0089066, filed on Sep. 3, 2007, in the Korean Intellectual Property Office, the disclosures of which are incorporated herein in their entirety by reference.

BACKGROUND OF THE INVENTION

1. Field of the Invention

The present invention relates to a method and apparatus for transmitting error information from a communication system, and more particularly, to an Ethernet over synchronous digital hierarchy (SDH) system for transmitting error information through a SDH network.

The work was supported by the Information Technology (IT) Research & Development (R&D) program of the Ministry of Information and Communication (MIC) and the Institute for Information Technology Advancement (IITA) [2005-S-101-02, Multimedia QoS Routing Technology Development].

2. Description of the Related Art

An Ethernet network and a SDH network of a conventional Ethernet over SDH (EoS) system are logically separated from each other and thus, when an error occurs in any one of the Ethernet network or the SDH network, information on the error cannot be transmitted to the opposite network. That is, when data is transmitted by using the SDH network in order to ensure the quality and performance of Ethernet frame, if an error occurs in the SDH network, the error is processed by using an existing protection/restoration function of the SDH network.

However, in this case, the information on the error occurring in the SDH network is not transmitted to the Ethernet network so that the error cannot be processed from a linked part of the SDH network and the Ethernet network. Therefore, the protection/restoration function cannot be performed for the whole EoS system, the performance of the Ethernet frame cannot be ensured, and the networks cannot be efficiently managed.

SUMMARY OF THE INVENTION

The present invention provides a method and apparatus for transmitting error information between an Ethernet network and a synchronous digital hierarchy (SDH) network in which, when an error occurs in the Ethernet network or the SDH network, information on the error may be linked by using a linked part of the SDH network and the Ethernet network and which may be applied to an existing system without additionally changing hardware or defining a new operations, administration, and maintenance (OAM) frame.

According to an aspect of the present invention, there is provided an apparatus for transmitting error information between an Ethernet network and a synchronous digital hierarchy (SDH) network in an Ethernet over SDH (EoS) network which transmits Ethernet frame by using the SDH network, the apparatus including: a frame transmission/reception unit for transmitting/receiving an Ethernet frame through a plurality of optical transmission/reception ports and detecting an error of a physical link; a media access control (MAC) processing unit for detecting an operations, administration, and maintenance (OAM) frame and state information of each port by deciphering header information of the Ethernet frame input from the frame transmission/reception unit, generating the Ethernet OAM frame based on the state and error information of each port or each flow, and transmitting the OAM frame to the Ethernet network through the frame transmission/reception unit; a SDH processing unit for receiving state and error information of the Ethernet network and generating a corresponding SDH OAM frame; an output interface unit for receiving the SDH OAM frame and SDH frame generated by and transmitted from the SDH processing unit and outputting the SDH OAM frame and SDH frame to the SDH network; and a signal processing unit for receiving information on the state and error detected by the MAC processing unit, generating a corresponding OAM signal, and transmitting the state and error information of the Ethernet network to the SDH processing unit, the state and error information used to generate information for generating the SDH OAM frame.

According to another aspect of the present invention, there is provided a method of transmitting information on an error occurring in a synchronous digital hierarchy (SDH) network to an Ethernet network in an Ethernet over SDH (EoS) network which transmits Ethernet frame by using the SDH network, the method including: monitoring a SDH frame input from each port and detecting a SDH OAM frame; if the SDH OAM frame is detected, determining whether the SDH OAM frame includes error information of the SDH network or not; and if the SDH OAM frame includes the error information, discontinuing transmitting of normal data frames, generating an Ethernet OAM frame by inserting OAM information corresponding to the error into an OAM type region of an MAC control parameter region that follows the format of an MAC control frame and inserting information and values corresponding to the error into an OAM data region, and transmitting the Ethernet OAM frame to the Ethernet network.

According to another aspect of the present invention, there is provided a method of transmitting information on an error occurring in an Ethernet network to a synchronous digital hierarchy (SDH) network in an Ethernet over SDH (EoS) network which transmits Ethernet frame by using the SDH network, the method including: monitoring an Ethernet frame input from each port and detecting an Ethernet OAM frame; if the Ethernet OAM frame is detected, determining whether the Ethernet OAM frame includes error information of the Ethernet network or not; and if the Ethernet OAM frame includes the error information, discontinuing transmitting of normal data frames, generating a SDH OAM frame including information corresponding to the error information, and if the Ethernet OAM frame does not include the error information and includes network linkage information or performance information, generating a SDH OAM frame by inserting network linkage response or corresponding performance information into the SDH OAM frame, and transmitting the SDH OAM frame to the SDH network.

BRIEF DESCRIPTION OF THE DRAWINGS

The above and other features and advantages of the present invention will become more apparent by describing in detail exemplary embodiments thereof with reference to the attached drawings in which:

FIGS. 2A through 2D are diagrams for describing a method of transmitting an OAM signal including information on an error occurring in a SDH network, according to an embodiment of the present invention.

FIGS. 4A and 4B are diagrams for describing the format and type of an OAM frame for transmitting OAM information including error information, according to an embodiment of the present invention.

DETAILED DESCRIPTION OF THE INVENTION

Hereinafter, the present invention will be described in detail by explaining embodiments of the invention with reference to the attached drawings.

Figure 1:
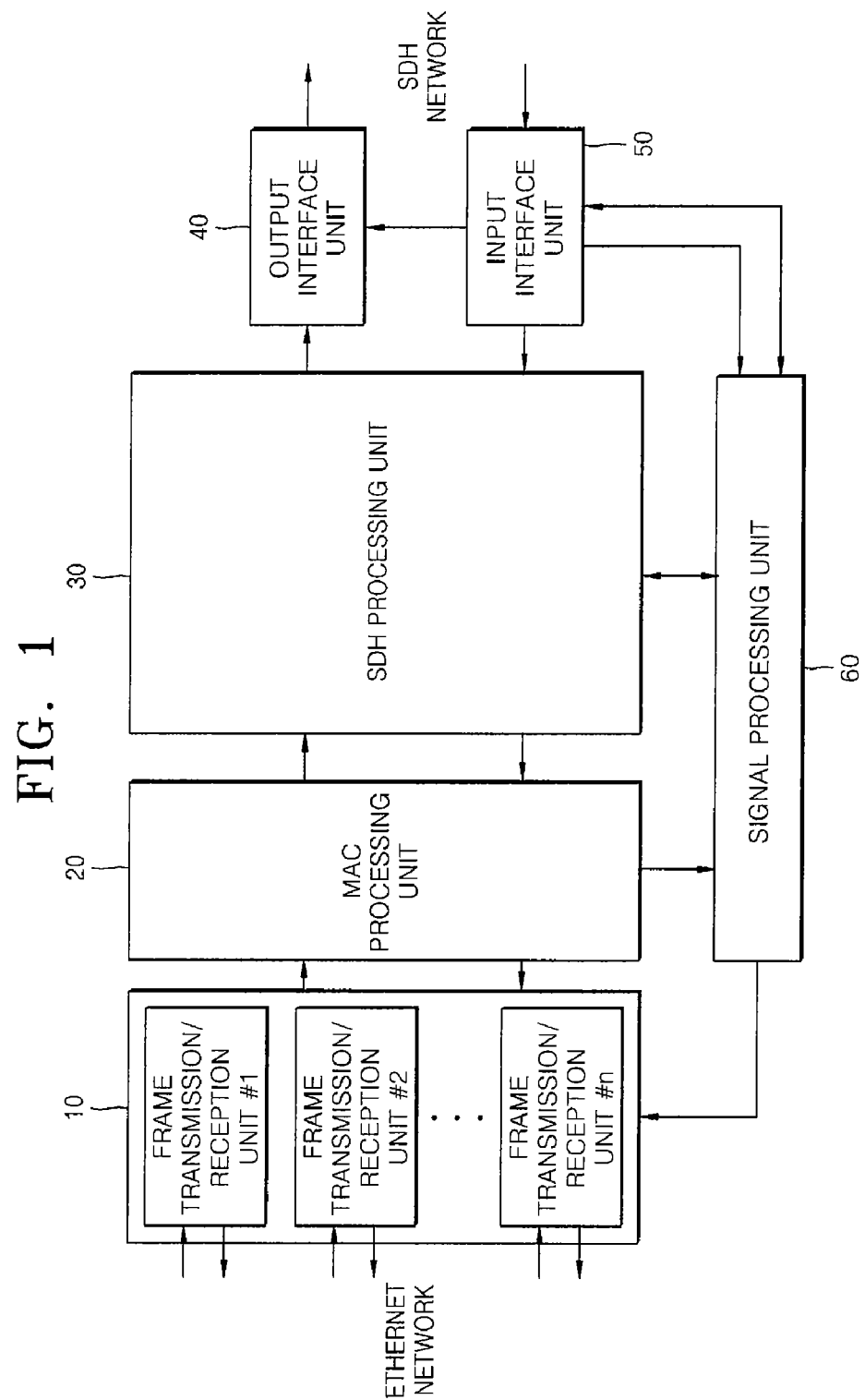
FIG. 1 is a block diagram of an apparatus for transmitting error information between an Ethernet network and a synchronous digital hierarchy (SDH) network, according to an embodiment of the present invention.

FIG. 1 is a block diagram of an apparatus for transmitting error information between an Ethernet network and a synchronous digital hierarchy (SDH) network in an Ethernet over SDH (EoS) network which transmits Ethernet frame by using the SDH network, according to an embodiment of the present invention.

Referring to FIG. 1, the apparatus includes a frame transmission/reception unit 10 for transmitting/receiving an Ethernet frame through a plurality of optical transmission/reception ports and detecting an error of a physical link, a media access control (MAC) processing unit 20 for detecting an operations, administration, and maintenance (OAM) frame and state information of each port by deciphering header information of the Ethernet frame input from the frame transmission/reception unit 10, generating the OAM frame based on the state and error information of each port or each flow, and transmitting the OAM frame to the Ethernet network through the frame transmission/reception unit 10, a SDH processing unit 30 for receiving state and error information of the Ethernet network and generating a corresponding SDH OAM frame, an output interface unit 40 for receiving the SDH OAM frame and SDH frame generated by and transmitted from the SDH processing unit 30 and outputting the SDH OAM frame and SDH frame to the SDH network, an input interface unit 50 for transmitting a SDH frame input from the SDH network to the SDH processing unit 30, and a signal processing unit 60 for receiving information on the state and error detected by the MAC processing unit 20, generating a corresponding OAM signal, and transmitting the state and error information of the Ethernet network to the SDH processing unit 30, the state and error information used to generate information for generating the SDH OAM frame.

Here, the MAC processing unit 20 detects the OAM frame by deciphering the header information of the Ethernet frame input from the frame transmission/reception unit 10 and transmits statistics information and state information of each port to the signal processing unit 60.

In this case, the format of the detected OAM frame follows the format of a standard MAC control frame.

Also, the MAC processing unit 20 classifies the Ethernet frame input from the frame transmission/reception unit 10 by using port information or MAC header information and transmits the classified Ethernet frame to a corresponding virtual container.

The SDH processing unit 30 encapsulates the Ethernet frame input from the MAC processing unit 20 into the SDH frame and transmits the SDH frame to a corresponding virtual container. Also, the SDH processing unit 30 decapsulates the Ethernet frame from the SDH frame input from the SDH network and outputs the Ethernet frame to the MAC processing unit 20. Furthermore, the SDH processing unit 30 receives the error information from the signal processing unit 60 and generates the SDH OAM frame.

In this case, the format of the generated SDH OAM frame follows the format of the standard SDH OAM frame. The SDH OAM frame is generated by inserting Ethernet OAM frame into the payload. Ethernet OAM frame has OAM information and OAM values which correspond to an error occurring in the SDH network or the Ethernet network into an OAM data region located in a region of MAC control parameters following the formats of the MAC control frame. The Ethernet OAM frame will be described later in detail.

The output interface unit 40 outputs the SDH frame input from the SDH processing unit 30 to the SDH network.

The input interface unit 50 receives the error information of the SDH network and transmits the error information to the signal processing unit 60, and the signal processing unit 60 receives the error information as input and generates the corresponding OAM signal.

Also, the signal processing unit 60 controls the output interface unit 40 to output data to the SDH network, and stores and manages the results processed by the MAC processing unit 20 and the SDH processing unit 30.

The frame transmission/reception unit 10 measures the strength of an optical signal input from the Ethernet network and detects loss of signal (LOS) of the optical signal.

FIGS. 2A through 2D are diagrams for describing a method of transmitting an OAM signal including information on an error occurring in a SDH network 300, according to an embodiment of the present invention.

Figure 2A:
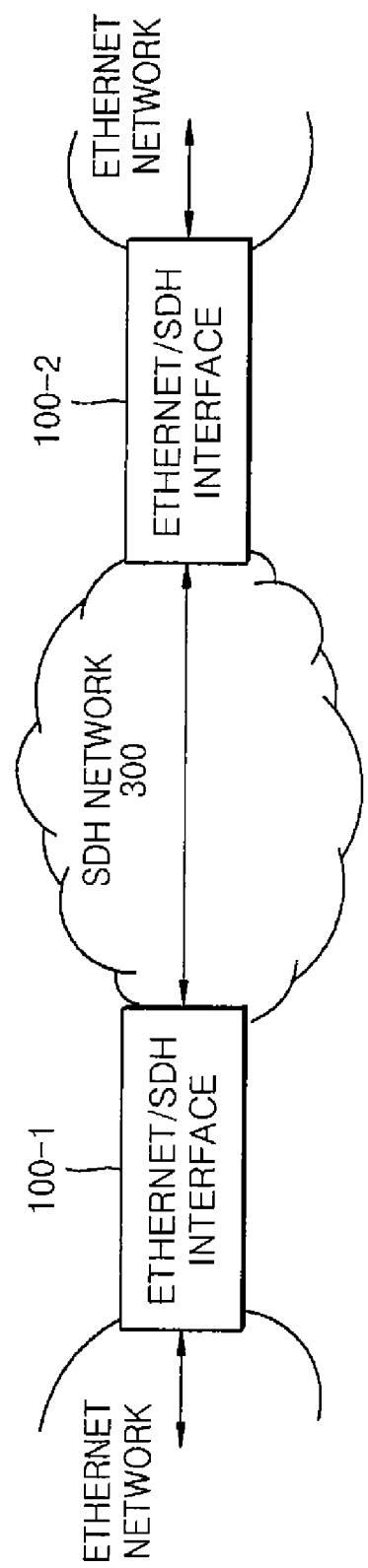

Referring to FIG. 2A, an Ethernet network and the SDH network 300 are linked by an Ethernet/SDH interface 100-1, another Ethernet network and the SDH network 300 are linked by an Ethernet/SDH interface 100-2, and the Ethernet/SDH interfaces 100-1 and 100-2 are linked with the same SDH network 300. The linked structure of the Ethernet networks and the SDH network 300 will be maintained in FIGS. 2A through 2D.

The apparatus for transmitting error information between an Ethernet network and a SDH network, which is described in FIG. 1, is included and operates in each of the Ethernet/SDH interfaces 100-1 and 100-2.

Figure 2B:
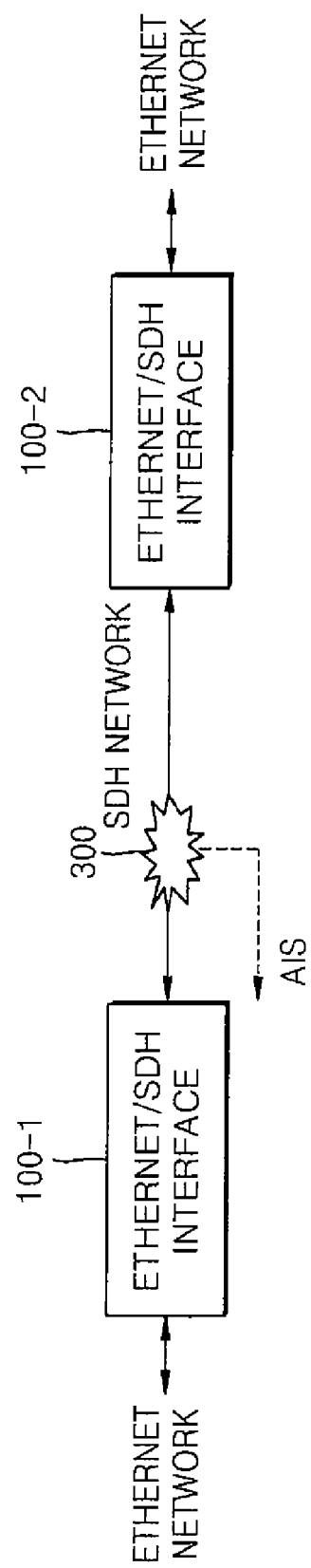

Referring to FIG. 2B, when the error occurs in the SDH network 300, a node detects the error and transmits an alarm indication signal (AIS) to a downstream direction.

Referring to FIG. 2C, when the AIS is input to the Ethernet/SDH interface 100-1 in the downstream direction, the Ethernet/SDH interface 100-1 transmits an OAM frame according to the present invention to the Ethernet network linked with the Ethernet/SDH interface 100-1 and transmits a remote defect indication (RDI) signal to the Ethernet/SDH interface 100-2 through the SDH network 300.

Figure 2D:
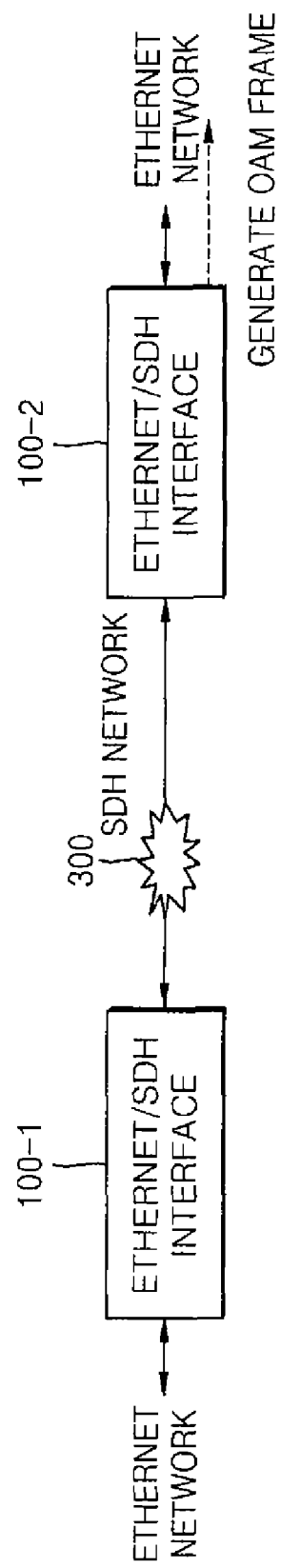

Referring to FIG. 2D, the Ethernet/SDH interface 100-2 in an upstream direction receives the RDI signal and transmits the OAM frame defined according to the present invention to the other Ethernet network linked with the Ethernet/SDH interface 100-2. The OAM frame according to the present invention will be described later in detail.

FIGS. 3A through 3D are diagrams for describing a method of transmitting an OAM signal including information on an error occurring in an Ethernet network, according to an embodiment of the present invention. Here, the linked structure of Ethernet networks and a SDH network is substantially the same as the linked structure illustrated in FIGS. 2A through 2D.

As in FIGS. 2A through 2D, the apparatus for transmitting error information between an Ethernet network and a SDH network, which is described in FIG. 1, is included and operates in each of the Ethernet/SDH interfaces 100-1 and 100-2.

Figure 3A:
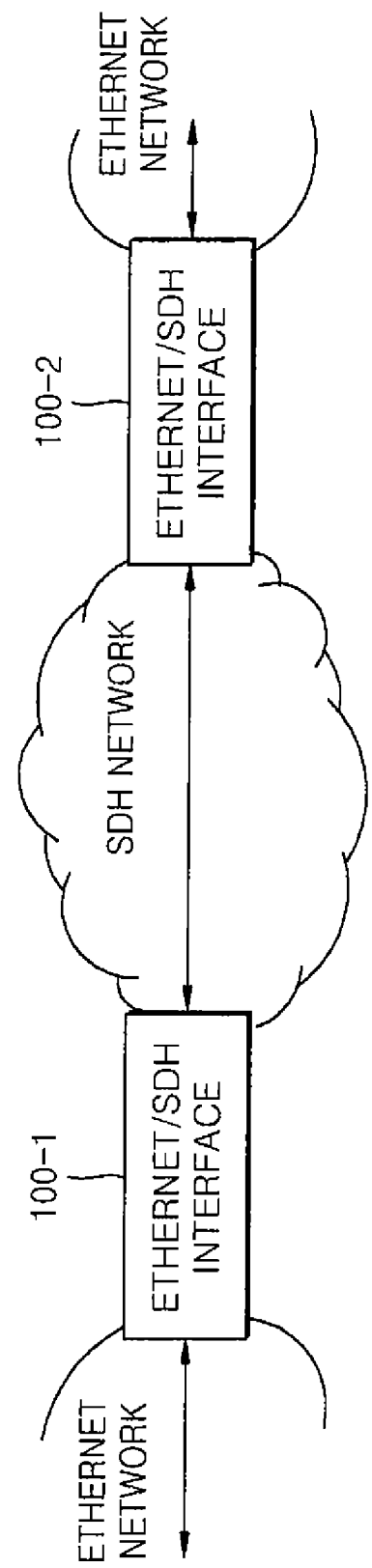
FIGS. 3A through 3D are diagrams for describing a method of transmitting an OAM signal including information on an error occurring in an Ethernet network, according to an embodiment of the present invention.

Referring to FIG. 3A, the Ethernet network and the SDH network are linked by the Ethernet/SDH interface 100-1, another Ethernet network and the SDH network are linked by the Ethernet/SDH interface 100-2, and the Ethernet/SDH interfaces 100-1 and 100-2 are linked with the same SDH network. The linked structure of the Ethernet networks and the SDH network will be maintained in FIGS. 3A through 3D.

Figure 3B:
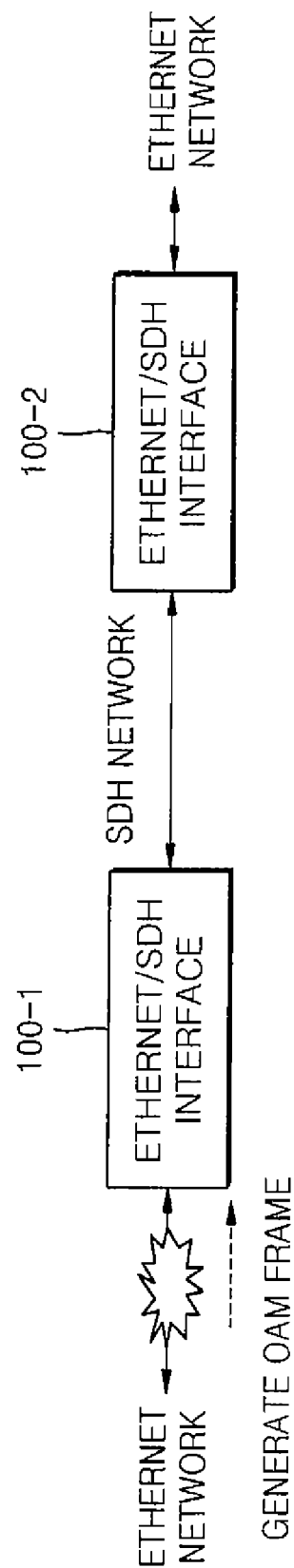

Referring to FIG. 3B, when the error occurs in the Ethernet network linked with the Ethernet/SDH interface 100-1, a node detects the error and transmits an OAM frame according to the present invention to an upstream direction.

Figure 3C:
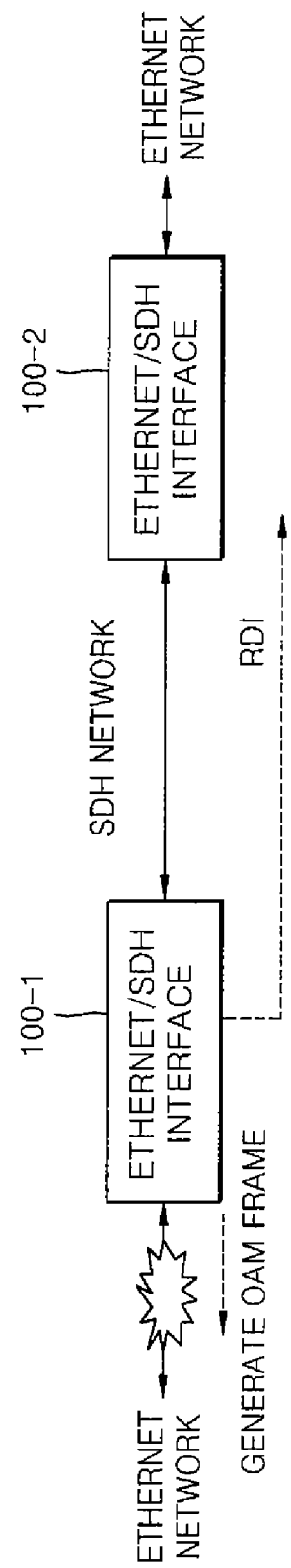

Referring to FIG. 3C, when the OAM frame is input to the Ethernet/SDH interface 100-1 in the upstream direction, the Ethernet/SDH interface 100-1 transmits the OAM frame according to the present invention to the Ethernet network in a downstream direction which corresponds to a port through which the OAM frame is input, and transmits an RDI signal to the Ethernet/SDH interface 100-2 through the SDH network.

Figure 3D:
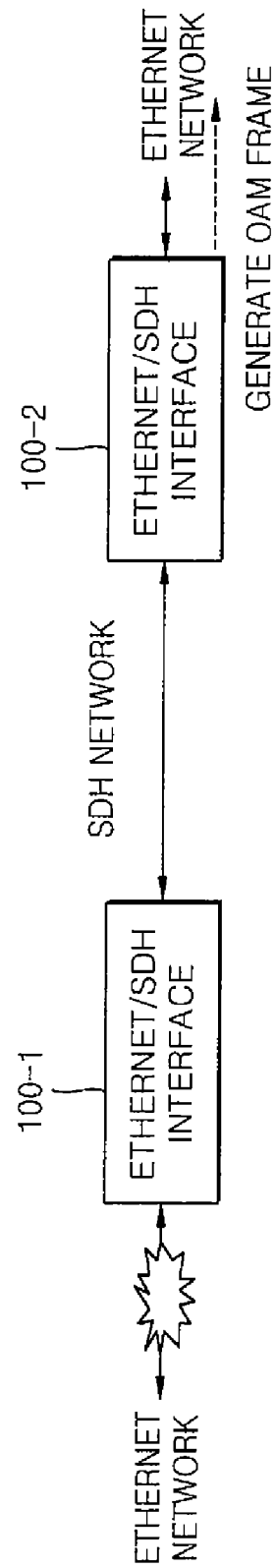

Referring to FIG. 3D, the Ethernet/SDH interface 100-2 in the upstream direction receives the RDI signal and transmits the OAM frame according to the present invention to the other Ethernet network linked with the Ethernet/SDH interface 100-2.

Figure 4A:
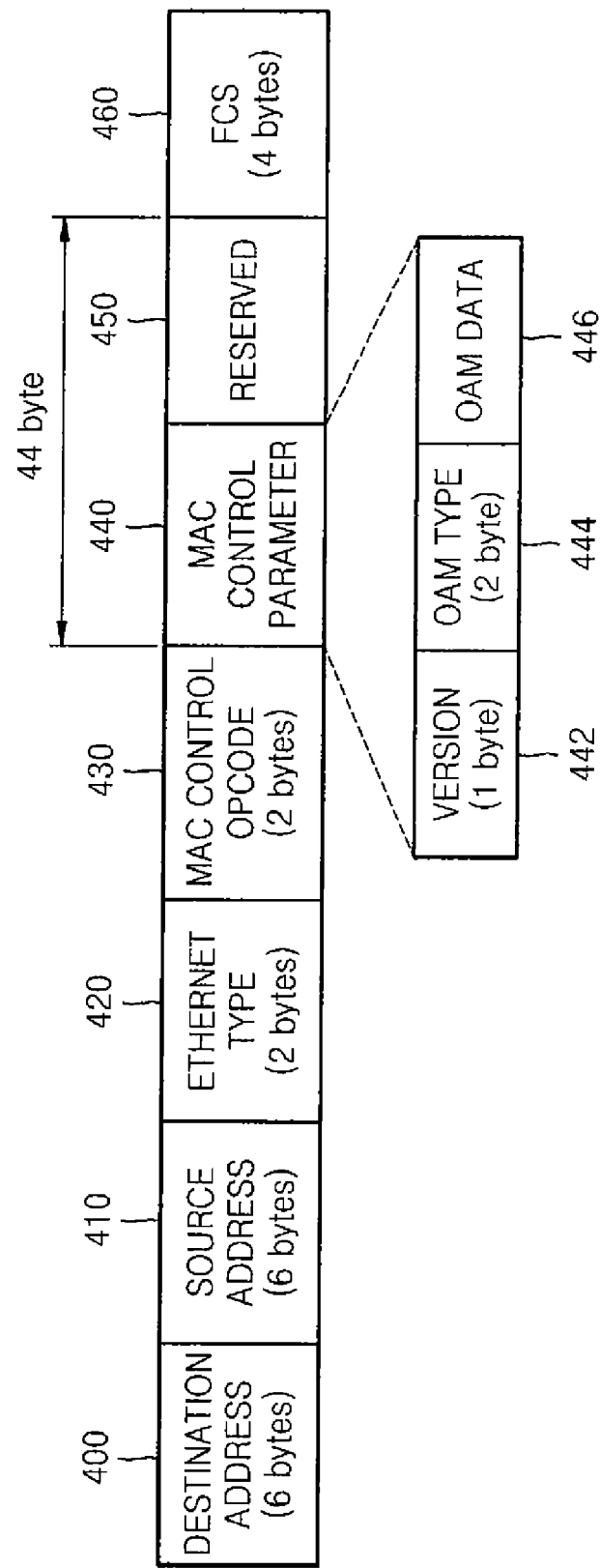

FIGS. 4A and 4B are diagrams for describing the format and type of an OAM frame for transmitting OAM information including error information, according to an embodiment of the present invention.

Referring to FIG. 4A, the OAM frame has a fixed length of sixty four bytes and follows the format of an MAC control frame defined by the Institute of Electrical and Electronics Engineers (IEEE) 802.3 standard. The OAM frame is composed of six bytes of a destination address region 400, six bytes of a source address region 410, two bytes of an Ethernet type region 420, two bytes of an MAC control opcode region 430, forty four bytes of an MAC control parameter region 440 and a reserved region 450, and four bytes of a frame check sequence (FCS) region 460.

The MAC control parameter region 440 is composed of an OAM frame version information region 442, an OAM type region 444, and an OAM data region 446.

If an error occurs in a SDH network or an Ethernet network, corresponding OAM information is inserted into the OAM type region 444 of the MAC control parameter region 440, and corresponding information and values are inserted into the OAM data region 446 and are transmitted to a neighboring node.

According to an embodiment of the present invention, the Ethernet type region 420 is set by using 0x8808 that indicates the MAC control frame and the MAC control opcode region 430 is set by using 0x0002.

An example of the OAM type region 444 is illustrated in FIG. 4B. Main performance information is defined as loss of frame (LOF), delay, and jitter, and values corresponding to the performance information are inserted into the OAM data region 446 and are transmitted to the neighboring node.

Figure 5:
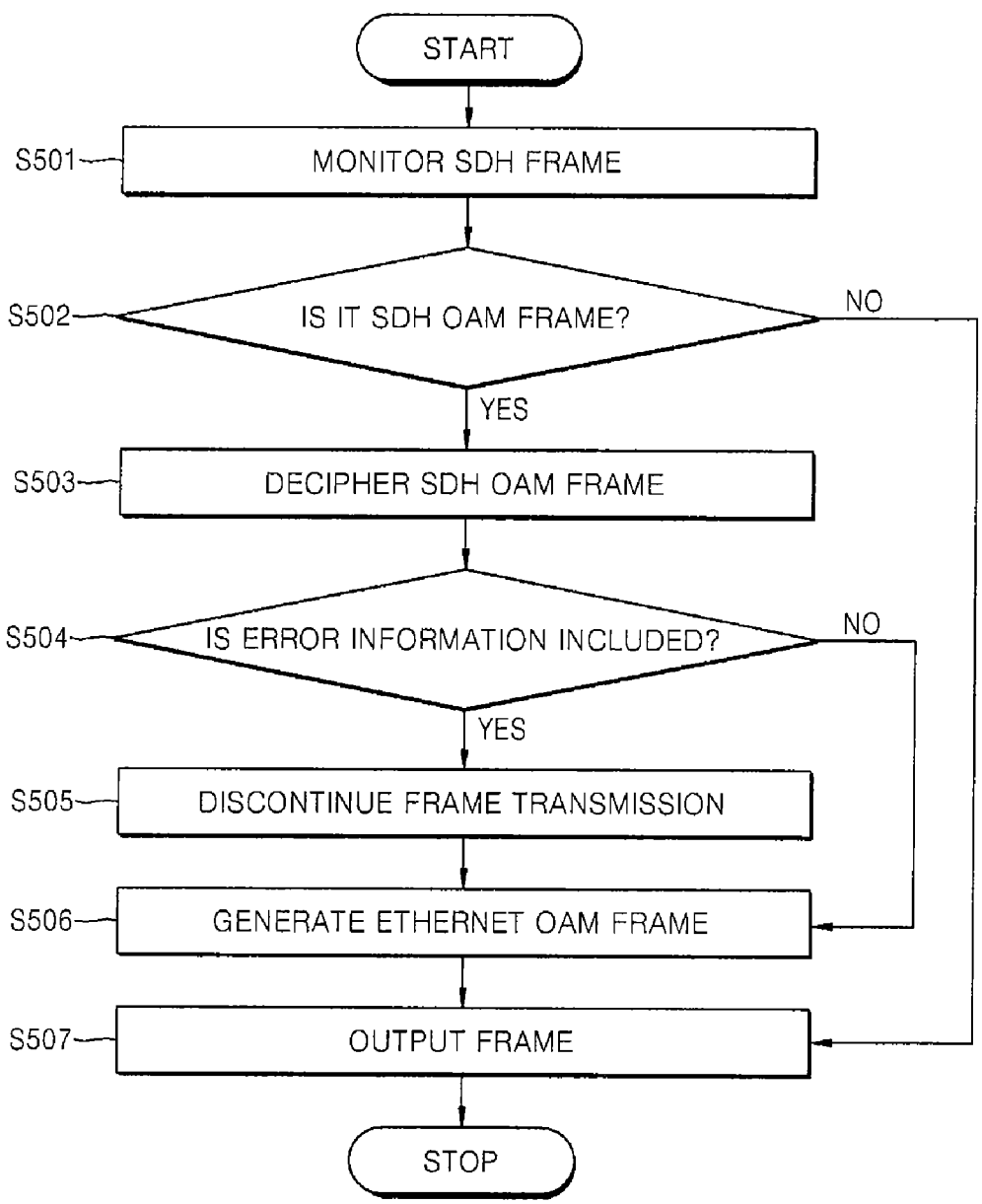
FIG. 5 is a flowchart of a method of transmitting information on an error occurring in a SDH network to an Ethernet network, according to an embodiment of the present invention.

FIG. 5 is a flowchart of a method of transmitting information on an error occurring in a SDH network to an Ethernet network, according to an embodiment of the present invention.

Referring to FIG. 5, a SDH frame input from each port is monitored so as to detect the error occurring in the SDH network in operation S501. When a SDH OAM frame is input, the SDH OAM frame is transmitted to the signal processing unit 60 illustrated in FIG. 1, in operation S502.

The signal processing unit 60 deciphers the SDH OAM frame transmitted in operation S502, in operation S503. It is determined whether the SDH OAM frame includes error information or not in operation S504. If the SDH OAM frame includes the error information, transmitting of normal data frames is discontinued in operation S505. An Ethernet OAM frame including corresponding error information is generated, in operation S506.

If the SDH OAM frame does not include the error information and includes network linkage information or performance information in operation S504, network linkage response or corresponding performance information is inserted into the Ethernet OAM frame in operation S506. Here, the format of the Ethernet OAM frame follows the format of the OAM frame illustrated in FIGS. 4A and 4B.

If the SDH OAM frame is input, the Ethernet OAM frame is output and if not, a normal data frame is output in operation S507.

Figure 6:
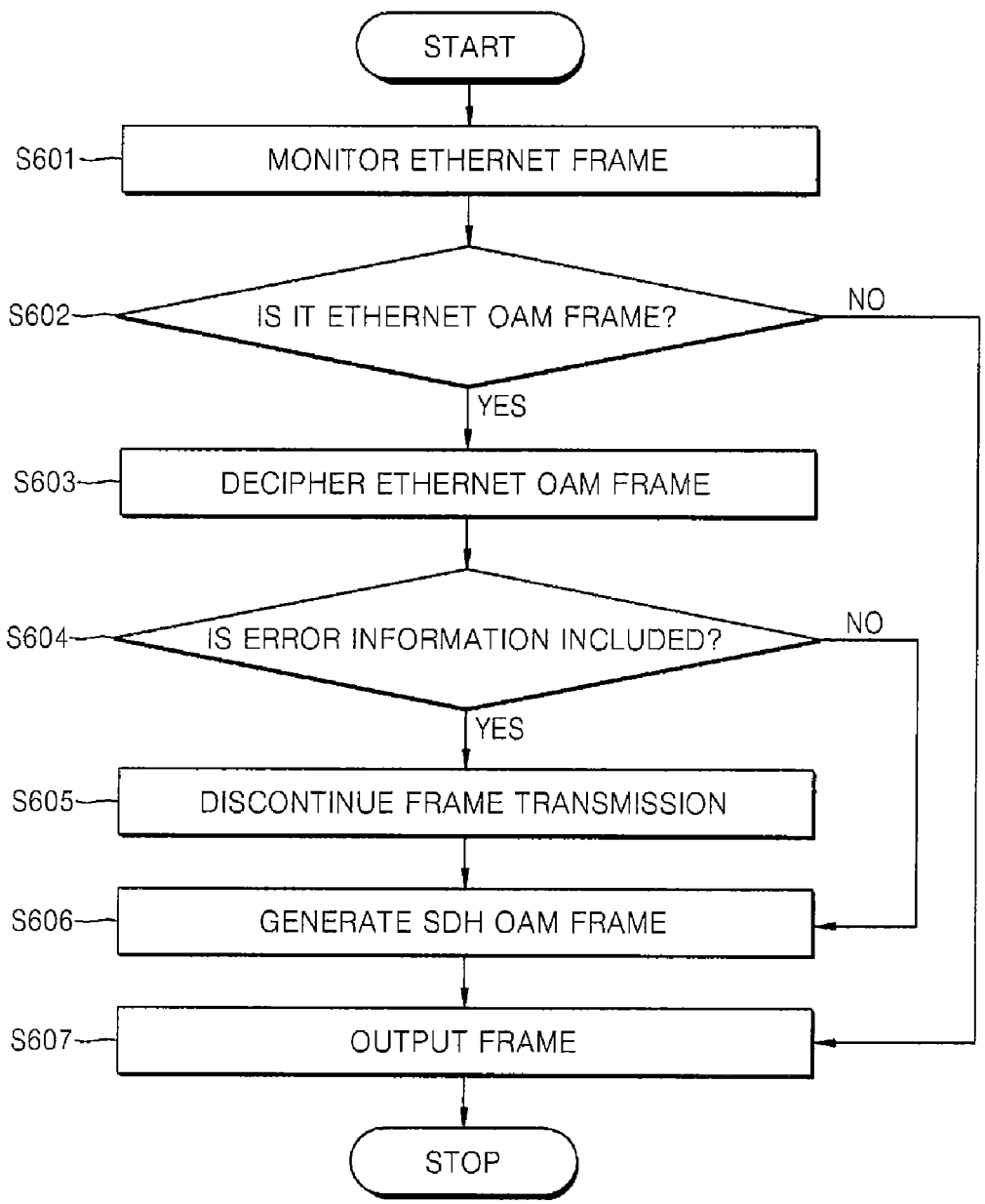
FIG. 6 is a flowchart of a method of transmitting information on an error occurring in an Ethernet network to a SDH network, according to an embodiment of the present invention.

FIG. 6 is a flowchart of a method of transmitting information on an error occurring in an Ethernet network to a SDH network, according to an embodiment of the present invention.

Referring to FIG. 6, an Ethernet frame input from each port is monitored so as to detect the error occurring in the Ethernet network in operation S601. When an Ethernet OAM frame is input, the Ethernet OAM frame is transmitted to the signal processing unit 60 illustrated in FIG. 1, in operation S602.

The signal processing unit 60 deciphers the Ethernet OAM frame transmitted in operation S602, in operation S603. It is determined whether the Ethernet OAM frame includes error information or not in operation S604. If the Ethernet OAM frame includes the error information, transmitting of normal data frames is discontinued in operation S605. A SDH OAM frame including corresponding error information is generated, in operation S606.

If the Ethernet OAM frame does not include the error information and includes network linkage information or performance information in operation S604, network linkage response or corresponding performance information is inserted into the SDH OAM frame in operation S606. Here, the format of the SDH OAM frame follows the format of a conventional SDH OAM frame and the Ethernet frame having the format of the OAM frame illustrated in FIGS. 4A and 4B is included in a payload of the SDH OAM frame.

If the Ethernet OAM frame is input, the SDH OAM frame is output and if not, a normal data frame is output in operation S607.

As described above with reference to the embodiments of the present invention, the present invention suggests a new Ethernet OAM frame that uses a conventional MAC control frame in order to transmit error information between an Ethernet network and a SDH network.

In more detail, the present invention provides a method of sharing OAM information between an Ethernet network and a SDH network by using a conventional MAC control frame when an OAM frame is generated in order to transmit error information of the SDH network to the Ethernet network. Also, the present invention suggests a method that may be applied to an existing system without additionally changing hardware or defining a new OAM frame.

As described above, according to the present invention, an OAM frame may be transmitted between an Ethernet network and a SDH network of a conventional EoS network which are logically separated from each other. In more detail, when an error occurs in the Ethernet network or the SDH network, OAM information is transferred to the opposite network by using a conventional MAC control frame from a linked part of the Ethernet network and the SDH network and thus the EoS network may be efficiently operated and managed. Also, by using standardized MAC control frame, the present invention may be applied to an existing system without additionally changing hardware or defining a new OAM frame.

It is obvious to those of ordinary skill in the pertinent art that each operation of the present invention can be implemented in a software or hardware manner using a general programming method.

The present invention can also be implemented as computer-readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and carrier waves (such as data transmission through the Internet). The computer-readable recording medium can also be distributed over network-coupled computer systems so that the computer-readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. An apparatus for transmitting error information between an Ethernet network and a synchronous digital hierarchy (SDH) network in an Ethernet over SDH (EoS) network which transmits Ethernet frame by using the SDH network, the apparatus being provided between the Ethernet network and the SDH network, the apparatus comprising:
a frame transmission/reception unit for transmitting/receiving an Ethernet frame through a plurality of optical transmission reception ports and detecting an error of a physical link;
a media access control (MAC) processing unit for detecting an operations, administration, and maintenance (OAM) frame and state information of each port by deciphering header information of the Ethernet frame input from the frame transmission/reception unit, generating the OAM frame based on the state and error information of each port or each flow, and transmitting the OAM frame to the Ethernet network through the frame transmission/reception unit, wherein the OAM frame conforms to the format of an MAC control frame and includes the state and error information in an MAC control parameter region of the MAC control frame;
wherein the OAM frame is generated by inserting OAM information corresponding to the error into an OAM type region of the MAC control parameter region and inserting information and values corresponding to the error into an OAM data region of the MAC control parameter region;
a SDH processing unit for receiving state and error information of the Ethernet network and generating a corresponding SDH OAM frame, wherein the SDH OAM frame conforms to the format of a standard SDH OAM frame and includes the OAM frame havin~ the state and error information in a payload;
an output interface unit for receiving the SDH OAM frame and SDH frame generated by and transmitted from the SDH processing unit and outputting the SDH OAM frame and SDH frame to the SDH network; and
a signal processing unit for receiving information on the state and error detected and error information of the Ethernet network to the SDH processing unit, the state and error information used to generate information for generating the SDH QAM frame.

2. The apparatus of claim 1, wherein the MAC processing unit detects the OAM frame by deciphering the header information of the Ethernet frame input from the frame transmission/reception unit and transmits statistics information and state information of each port to the signal processing unit.

3. The apparatus of claim 2, wherein the MAC processing unit classifies the Ethernet frame input from the frame transmission/reception unit by using MAC header information and transmits the classified Ethernet frame to a corresponding virtual container.

4. The apparatus of claim 2, wherein the output interface unit outputs a SDH frame input from the SDH processing unit to the SDH network.

5. The apparatus of claim 1, wherein the SDH processing unit encapsulates the Ethernet frame input from the MAC processing unit into a SDH frame and transmits the SDH frame to a corresponding virtual container.

6. The apparatus of claim 5, wherein the SDH processing unit decapsulates the Ethernet frame from the SDH frame input from the SDH network and outputs the Ethernet frame to the MAC processing unit.

7. The apparatus of claim 1, wherein the SDH processing unit receives the state and error information from the signal processing unit and generates the SDH OAM frame.

8. The apparatus of claim 1, further comprising an input interface unit for transmitting a SDH frame input from the SDH network to the SDH processing unit.

9. The apparatus of claim 8, wherein the input interface unit receives error information of the SDH network and transmits the error information to the signal processing unit, and wherein the signal processing unit receives the error information as input and generates a corresponding OAM signal.

10. The apparatus of claim 1, wherein the signal processing unit controls the output interface unit to output data to the SDH network.

11. The apparatus of claim 1, wherein the signal processing unit stores and manages the results processed by the MAC processing unit and the SDH processing unit.

12. The apparatus of claim 1, wherein the frame transmission/reception unit measures the strength of an optical signal input from the Ethernet network and detects loss of signal (LOS) of the optical signal.

13. A method of transmitting information on an error occurring in a synchronous digital hierarchy (SDH) network to an Ethernet network in an Ethernet over SDH (EoS) network which transmits Ethernet frame by using the SDH network, the method comprising:
  providing an interface between the Ethernet network and the SDH network, the interface having a plurality of ports;
  monitoring a SDH frame input from each port of the interface and detecting a SDH OAM frame;
  if the SDH OAM frame is detected, determining whether the SDH OAM frame includes error information of the SDH network or not; and
  if the SDH OAM frame includes the error information, discontinuing transmitting of normal data frames, generating an Ethernet OAM frame by inserting OAM information corresponding to the error into an OAM type region of an MAC control parameter region that follows the format of an MAC control frame and inserting information and values corresponding to the error into an OAM data region of the MAC control parameter region, and transmitting the Ethernet OAM frame to the Ethernet network.

14. The method of claim 13, wherein, if the SDH OAM frame does not include the error information and includes network linkage information or performance information, generating an Ethernet OAM frame by inserting network linkage response or corresponding performance information into the Ethernet OAM frame and transmitting the Ethernet OAM frame to the Ethernet network.

15. A method of transmitting information on an error occurring in an Ethernet network to a synchronous digital hierarchy (SDH) network in an Ethernet over SDH (EoS) network which transmits Ethernet frame by using the SDH network, the method comprising:
  providing an interface between the Ethernet network and the SDH network, the interface having a plurality of ports;
  monitoring an Ethernet frame input from each port of the interface and detecting an Ethernet OAM frame;
  if the Ethernet OAM frame is detected, determining whether the Ethernet OAM frame includes error information of the Ethernet network or not;
  if the Ethernet OAM frame includes the error information, discontinuing transmitting of normal data frames, generating a SDH OAM frame including information corresponding to the error information, wherein the SDH OAM frame conforms to the format of a standard SDH OAM frame and includes the Ethernet OAM frame having the error information in a payload; and if the Ethernet OAM frame does not include the error information and includes network linkage information or performance information, generating a SDH OAM frame by inserting network linkage response or corresponding performance information into the SDH OAM frame, and transmitting the SDH OAM frame to the SDH network;
  wherein the Ethernet OAM frame is generated by inserting OAM information corresponding to the error into an OAM type region of the MAC control parameter region and inserting information and values corresponding to the error into an OAM data region of the MAC control parameter region.

* * * * *